Oct. 14, 1958    F. H. KAYLER    2,856,203
FIFTH WHEEL BRACKET
Filed Sept. 29, 1954
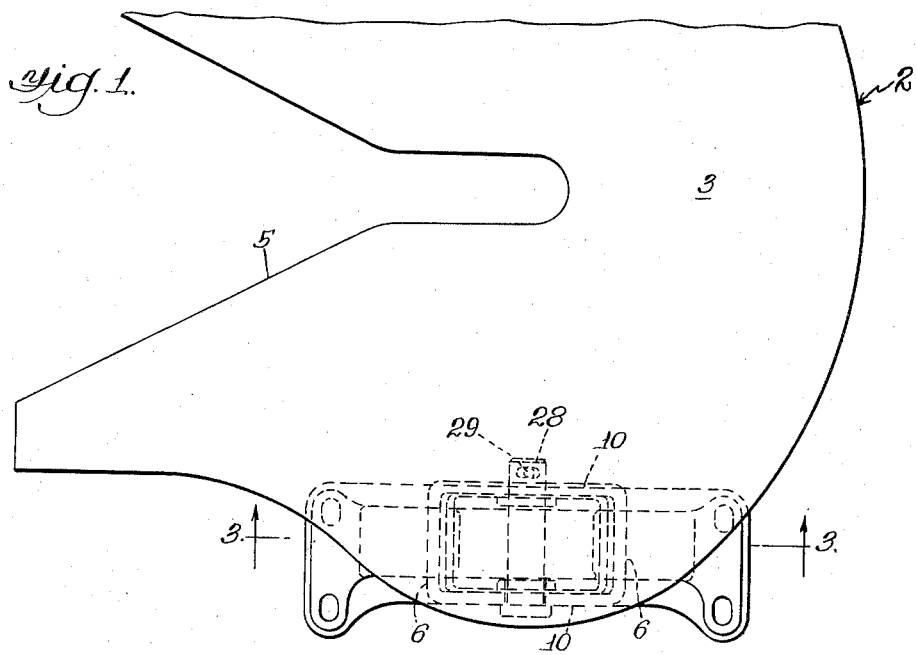
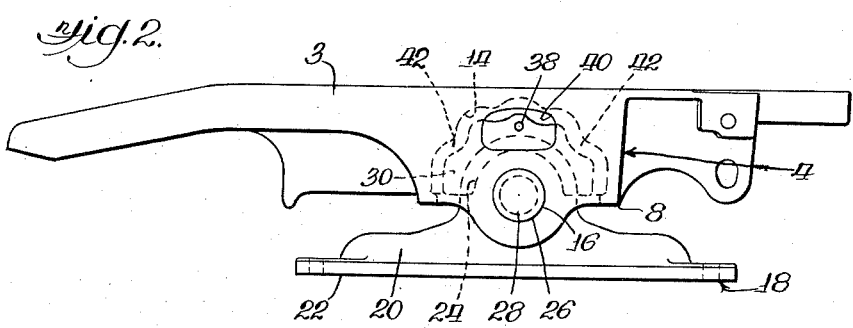
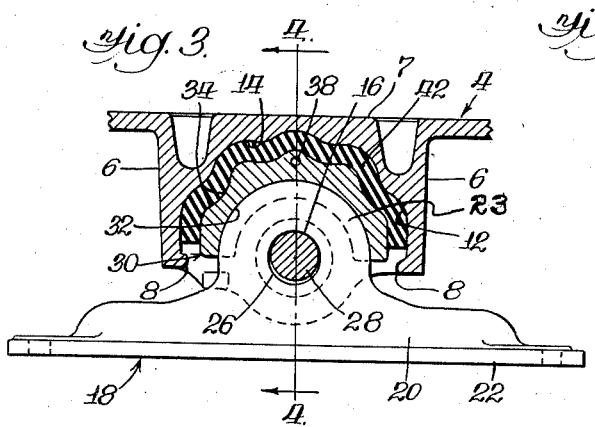
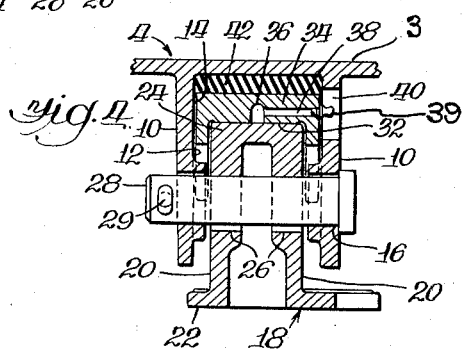
INVENTOR.
Frank H. Kayler
BY
Walter L. Schlegel, Jr.
Atty.

2,856,203
FIFTH WHEEL BRACKET

Frank H. Kayler, Alliance, Ohio, assignor to American Steel Foundries, Chicago, Ill., a corporation of New Jersey Application September 29, 1954, Serial No. 459,121

18 Claims. (Cl. 280—440)

This invention relates to tractor-trailer devices and more particularly to a novel improvement in a mounting arrangement for a fifth wheel.

The invention comprehends an arrangement, wherein the vertical and longitudinal shocks are cushioned by means of a resilient mounting connection.

Generally, support brackets are arranged for mounting on a tractor frame, or mounting plates attached to the frame, and provide for the pivotal attachment of a fifth wheel plate thereto to permit angling to meet service requirements.

Cushioning in a longitudinal direction is of special importance in absorbing the severe shocks of coupling which occur when the fifth wheel on a backing tractor engages a king pin on a stationary trailer. Cushioning in a vertical direction is advantageous in absorbing shocks of vibration and twisting strains set up between the plate and brackets.

The primary object of this invention is to provide a cushioned bracket arrangement for mounting a fifth wheel that is of simple design and will provide for the cushioning of vertical and longitudinal shocks.

A more specific object of this invention is the provision of a mounting arrangement of a fifth wheel on a tractor, wherein a fifth wheel is pivotally connected to a support bracket carried by the frame of the tractor, and wherein a bearing shoe and cushioning element are disposed between the support bracket and the fifth wheel.

Another object of the invention is to provide an arrangement, wherein a standard resilient pad may be utilized as a cushioning element.

Another object of the invention is to provide a structure which requires no machining and is comprised of parts of simple design well adapted for manufacture by the conventional casting or forging processes.

Another object of the invention is an arrangement, wherein the surfaces of a fifth wheel and a bearing shoe offer complementally corrugated arcuate surfaces separated by a resilient element.

These and other objects of the invention will become apparent from the reading of the description and from an examination of the drawings, wherein:

Figure 1 is a fragmentary top plan view of a conventional tractor fifth wheel assembly embodying the invention, only one mounting arrangement being shown, as the one of the other side would be similar;

Figure 2 is a side elevational view of the structure shown in Figure 1;

Figure 3 is a fragmentary sectional view taken along the side 3—3 of Figure 1; and Figure 4 is a fragmentary sectional view taken along the line 4—4 of Figure 3.

It will be noted that for purposes of clarity some of the parts have been intentionally omitted from some of the views where it was believed that they could be shown to more advantage in the other views.

Describing the invention in detail, the fifth wheel assembly, generally designated 2, comprises a flat wheel plate 3, bifurcated as at 5, to receive an engaging member (not shown) on the trailer for interlocking with the fifth wheel to couple the tractor to the trailer.

The fifth wheel assembly may be supported by the tractor frame (not shown) by a pivotal mounting arrangement indicated generally at 4. Depending from the plate 3 are end walls 6, and side walls 10, the end and side walls being connected to form a generally rectangular (as seen in plan view) pocket 12. The end walls 6 may be merged with the underside of plate 3 so as to define a concave (as seen in side view) upper limitation of the pocket 12 offering a corrugated or undulated surface 14.

Integral with the lower extremity of end walls 6 are inwardly extending positioning lugs 8 which serve to retain a resilient pad, hereinafter described, in position with the pocket 12. The side walls 10 define coaxially aligned openings 16 for receiving retaining means.

Mounted on the tractor frame (not shown) in vertical alignment with the side walls 10 are support brackets 18, each comprising longitudinally extending horizontal members 22 having spaced vertical walls 20 extending upwardly therefrom, the central portions of said walls defining a convex arc so as to form a head 23 thereon which is receivable in pocket 12 of the plate. The upper portions of walls 20 may be interconnected by a transversely extending web 24. The side walls define openings 26 which are in coaxial alignment with each other and with opening 16 of side wall 10. The head 23 of bracket 18 is retained pivotally within the pocket 12 by means of retaining pin 28 extending transversely of the brackets through openings 16 and 26 and a cotter 29 associated with the pin.

A bearing shoe 30 being somewhat generally semi-cylindrical (as seen in Figure 3) and having a smooth concave lower or under-surface 32 complementary to the upper surface of web 24 and having a convex upper or outer surface 34 which is corrugated or undulated complementally to the surface 14 is positioned in the pocket 12 in engagement with the web 24.

Additionally, the shoe 30 may be provided with a means of lubrication comprising a grease pocket 36 disposed centrally of surface 34, which pocket may be reached through channel 38 extending horizontally through the shoe to a conventional grease fitting 39. Opening 40 may be provided in side wall 10 of the mounting bracket in order that fitting 39 may be accessible for the greasing operation.

A resilient element 42, comprising a simple rubber pad which may be cut from conventional or standard rubber slabs and requires no special molding, is interposed between the complementally corrugated surfaces 14 and 34 of the pocket and shoe, respectively. The purpose of the pad 42 is to cushion the vertical and longitudinal shocks received by the mechanism. It will be noted that in order to provide for any cushioning movements of vertical shocks due to the load shocks from a supported trailer or of the longitudinal shocks due to coupling or load operations, some clearance must be allowed. This is preferably accomplished by providing a close fit between the pin 28 and the related opening 16 of the wall 10, and by enlarging opening 26 of the support bracket to afford all required clearance. It will be noted that clearance could also be afforded by enlarging opening 16 and reducing opening 26.

In assembling the device, the pad 42 is first placed in the pocket 12 adjacent surface 14, the pad being sprung at its ends to pass lugs 8 which serve to retain it in proper position. It will then assume a substantially radial shape and later will conform to the corrugated surface 14 when under pressure.

The bearing shoe is then placed in position in the pocket 12 with the upper surface 34 engaging the lower surface of the pad 42.

The head of the bracket 18 is then placed in the pocket 12 with the upper surface of the web 24 in engagement with the lower surface 32 of the bearing shoe.

At this point the pin opening 26 of the supporting bracket is not aligned with the pivot opening 16 of the wall 10 since the surface 34 of the shoe is still spaced a greater distance from the surface 14 than the thickness of the resilient pad, but pressure is then applied on top of the plate with the bracket 18 supported until the plate is forced downward and the pad 42 is compressed between surfaces 14 and 34 of the pocket and shoe, respectively, and conforms to the corrugations of the respective surfaces. At this point the openings 16 and 26 will be aligned and the pin 28 can be inserted and secured in place by cotter 29.

Figure 3 illustrates the assembled condition. It will be noted that after release of assembly pressure, the force exerted by the bent rubber acts to force the wheel plate upward, and the shoe and support bracket downward, separation being prevented by pin 28 which will be in tight engagement with bottom of opening 16 and top of opening 26. The reacting force of the bent rubber pad is adequate to support the fifth wheel and maintain a tight assembly even after considerable wear of parts, but it will not interfere with the angling of the plate relative to the tractor frame. Thus it will be seen that the rubber pad serves to cushion both the longitudinal shocks and the vertical shocks, by offering resistance to vertical pressure at the top of the pad, and by offering resistance to the longitudinal or shear pressures at the sides and ends of the pad.

The corrugated surface arrangement has distinct advantages over an arrangement offering smooth radial surfaces. (1) The bending of the rubber only for initial assembly provides for holding the parts in tight assembly even after considerable wear. (2) It also provides a relatively low supporting force for empty trailers so as to be more effective in absorbing light shocks and vibrations and serves to prevent rotation of the shoe on the pad or the pad in the pocket, thus preventing sliding and scuffing action which would tend to wear the pad out. It will also be apparent that the resilient pad will be effective to absorb longitudinal shocks at the same time that it is compressed under a vertical load because the corrugated surfaces enable it to withstand the shear stress applied.

I claim:

1. In a supporting arrangement for a fifth wheel assembly, a support member comprising a head, a plate member having a pocket therein to receive said head, said members being relatively pivotal about an axis, said head and said pocket presenting oppositely facing surfaces, and resilient means to cushion said assembly interposed between said surfaces and compressed in said pocket by said head, said resilient means and at least one of said surfaces being arranged and disposed to prevent relative rotational movement therebetween.

2. In a supporting arrangement for a fifth wheel assembly, a support member having a head thereon, a plate member having a pocket to receive said head, said members being relatively pivotal about an axis, and resilient means to cushion said assembly, said resilient means being compressed in said pocket by said head, said support member comprising a support bracket and a generally semi-cylindrical bearing shoe supported on said head and having circumferentially spaced ridges engaging said resilient means.

3. In a supporting arrangement for a fifth wheel assembly, a support member having a head thereon, a plate member having a pocket to receive said head, resilient means to cushion said assembly, said resilient means being compressed in said pocket by said head, said support member comprising a support bracket and a generally semi-cylindrical bearing shoe supported on said head and having circumferentially spaced ridges engaging said resilient means, and a pivotal connection between said members, said connection comprising coaxially aligned apertures in said members and a pin received in said apertures to connect said members.

4. In a supporting arrangement for a fifth wheel assembly, a support member having a head thereon, a plate member having a pocket to receive said head, resilient means to cushion said assembly, said resilient means being compressed in said pocket by said head, said support member comprising a support bracket and a generally semi-cylindrical bearing shoe supported on said head and having circumferentially spaced ridges engaging said resilient means, and a pivotal connection between said members, said connection comprising coaxially aligned apertures in said members and a pin received in said apertures to connect said members, the apertures in one of said members being of greater diameter than the apertures in the other of said members to limit relative radial movement between said members.

5. In a supporting arrangement for a fifth wheel assembly, a support member having a head thereon, a plate member having a pocket to receive said head, resilient means to cushion said assembly, said resilient means comprising a rubber pad compressed in said pocket by said head, said support member comprising a support bracket and a generally semi-cylindrical bearing shoe supported on said head and having circumferentially spaced ridges engaging said resilient means, and a pivotal connection between said members, said connection comprising coaxially aligned apertures in said members and a pin received in said apertures to connect said members, the apertures in one of said members being of greater diameter than the apertures in the other of said members to limit relative radial movement between said members.

6. In a supporting arrangement for a fifth wheel assembly, a support bracket member rigidly mounted on a tractor frame and having an arcuate convex surface thereon, a plate member defining a pocket therein, said pocket having an arcuate concave surface therein, a concave-convex bearing shoe member interposed between said concave and convex surfaces, and resilient means interposed between said shoe member and one of said other members.

7. In a supporting arrangement for a fifth wheel assembly, a support member having an arcuate convex surface thereon, a plate member defining a pocket therein, said pocket having an arcuate concave surface therein, a concave-convex bearing shoe member interposed between said concave and convex surfaces, and resilient means interposed between said shoe member and one of the other members, one of the surfaces on said shoe member and the surface of one of said other members each being formed with circumferentially spaced ridges to engage said resilient means therebetween.

8. In a supporting arrangement for a fifth wheel assembly, a support member having an arcuate convex surface thereon, a plate member defining a pocket therein, said pocket having an arcuate concave surface therein, a concave-convex bearing shoe member interposed between said concave and convex surfaces, resilient means interposed between said shoe member and one of the other members, one of the surfaces on said shoe member and the surface of one of said other members each being formed with circumferentially spaced ridges to engage said resilient means therebetween, and a pivotal connection between the support member and the plate member, said connection affording pivotal clearance to limit relative movement of the members.

9. In a mounting arrangement for a fifth wheel assembly, a plate member having an arcuate undulated surface thereon, a support member having an arcuate undulated surface thereon, said surfaces having circumferentially spaced ridges, a resilient pad interposed between said surfaces and defining the contour of said surfaces, and a pivotal pin connecting said members.

10. A supporting arrangement according to claim 9, wherein said pivotal pin is in relatively tight engagement with one of said members and in relatively loose engagement with the other of said members to limit radial movement between the members.

11. A supporting arrangement according to claim 10, wherein one of said members includes a bearing shoe operatively engageable with the other of said members.

12. In a mounting arrangement, a plate member, sides depending from said member defining a pocket therebetween, said sides having coaxially aligned apertures therein, a support member, sides upstanding from said support member defining a head therebetween, said sides having apertures therein, said apertures being in coaxial alignment with each other and with said last mentioned apertures, a pin received in all of said apertures serving to connect said members, and resilient means interposed between said members.

13. A mounting arrangement according to claim 12, wherein the apertures in one of said members are larger than those in the other of said members to provide pivotal clearance between said members, and including complementally corrugated surfaces on said members co-operatively associated with each other, and wherein one of said members includes a bearing shoe.

14. In a supporting arrangement for a fifth wheel assembly, a combination of: a support bracket member, a plate member, one of said members including a head portion received within a pocket presented by spaced portions of the other of said members, a pin extending through aligned apertures of said members and operable to interconnect them for relative pivotal movement therebetween, and resilient means in said pocket maintained under compression between said members by said pin, certain of said apertures being of larger diameter than the pin and other of said apertures to afford limited, cushioned, nonpivotal movement between the respective members.

15. A supporting arrangement for a fifth wheel assembly according to claim 14 and including a bearing shoe interposed between one of the members and the resilient means.

16. In a supporting arrangement for a fifth wheel assembly, a combination of: a support bracket member, a plate member, one of said members including a head portion received within a pocket defined by spaced portions of the other of said members, a pin extending through aligned apertures of said members and operable to interconnect them for relative pivotal movement therebetween, resilient means in said pocket compressibly interposed between said members, and a bearing shoe interposed between the resilient means and one of the members and presenting an arcuate bearing surface slidably engageable with an arcuate bearing surface on said one member, said bearing shoe including an internal opening communicating with said bearing surfaces and with an aperture in one of said members to accommodate the lubrication of said bearing surfaces while the arrangement is in assembled condition.

17. A supporting arrangement for a fifth wheel assembly according to claim 16 wherein said opening includes a peripheral groove portion adjacent said bearing surfaces and a transversely extending passageway portion communicating with said groove portion and said aperture.

18. A supporting arrangement for a fifth wheel assembly according to claim 16 wherein passages are afforded between said bearing shoe and said one member to accommodate lubricating material to pass from the opening to the pin to lubricate said pin.

References Cited in the file of this patent

UNITED STATES PATENTS

| | | |
|---|---|---|
| 2,196,537 | Sherman | Apr. 9, 1940 |
| 2,263,114 | Winn | Nov. 18, 1941 |
| 2,289,079 | Seyferth | July 7, 1942 |
| 2,359,499 | Walther | Oct. 3, 1944 |
| 2,674,505 | Pfenninger | Apr. 6, 1954 |
| 2,779,605 | Braunberger | Jan. 29, 1957 |
| 2,784,009 | Braunberger | Mar. 5, 1957 |

FOREIGN PATENTS

| | | |
|---|---|---|
| 111,071 | Australia | July 16, 1940 |